(12) United States Patent
Kumar

(10) Patent No.: US 9,846,475 B2
(45) Date of Patent: Dec. 19, 2017

(54) CONTROLLING POWER CONSUMPTION IN MULTI-CORE ENVIRONMENTS

(75) Inventor: Anil K. Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 228 days.

(21) Appl. No.: 13/977,525

(22) PCT Filed: Mar. 31, 2012

(86) PCT No.: PCT/US2012/031751
§ 371 (c)(1),
(2), (4) Date: Sep. 23, 2014

(87) PCT Pub. No.: WO2013/147906
PCT Pub. Date: Oct. 3, 2013

(65) Prior Publication Data
US 2015/0019891 A1  Jan. 15, 2015

(51) Int. Cl.
G06F 1/00 (2006.01)
G06F 1/32 (2006.01)
G06F 1/20 (2006.01)

(52) U.S. Cl.
CPC .............. *G06F 1/324* (2013.01); *G06F 1/206* (2013.01); *G06F 1/3206* (2013.01); *G06F 1/3296* (2013.01); *Y02B 60/1217* (2013.01); *Y02B 60/1275* (2013.01); *Y02B 60/1285* (2013.01)

(58) Field of Classification Search
CPC ........ G06F 1/324; G06F 1/206; G06F 1/3206; G06F 1/3296; Y02B 60/1217; Y02B 60/1275; Y02B 60/1285
USPC .................................................. 713/322, 300
See application file for complete search history.

(56) References Cited

U.S. PATENT DOCUMENTS

| | | | |
|---|---|---|---|
| 7,849,332 B1 | 12/2010 | Alben et al. | |
| 2006/0090086 A1 | 4/2006 | Rotem et al. | |
| 2006/0282692 A1 | 12/2006 | Oh | |
| 2007/0198872 A1 | 8/2007 | Bailey et al. | |
| 2008/0201591 A1 | 8/2008 | Hu et al. | |
| 2009/0313489 A1* | 12/2009 | Gunther | G06F 1/3203 713/300 |

(Continued)

FOREIGN PATENT DOCUMENTS

| | | |
|---|---|---|
| CN | 1577280 A | 2/2005 |
| CN | 100461072 C | 2/2009 |

(Continued)

OTHER PUBLICATIONS

International Search Report and Written Opinion received for PCT application No. PCT/US2012/031751, mailed on Nov. 9, 2012, 10 pages.

(Continued)

*Primary Examiner* — Robert Cassity
(74) *Attorney, Agent, or Firm* — Jordan IP Law, LLC

(57) ABSTRACT

Systems and methods of enabling modulation of a frequency of a first core in a multi-core environment include logic to determine a power limit assigned to the first core, logic to determine a stall count of the first core, and logic to modulate the frequency of the first core based at least on the power limit assigned to the first core and the stall count of the first core. The first core is included in a first tile of a socket in the multi-core computer environment.

28 Claims, 5 Drawing Sheets

(56) References Cited

U.S. PATENT DOCUMENTS

| | | | |
|---|---|---|---|
| 2011/0022857 A1* | 1/2011 | Nussbaum | G06F 1/3203 713/300 |
| 2011/0022865 A1 | 1/2011 | Gunther et al. | |
| 2012/0054521 A1 | 3/2012 | Naffziger | |
| 2012/0079290 A1* | 3/2012 | Kumar | G06F 1/26 713/300 |
| 2012/0166832 A1* | 6/2012 | Henry | G06F 1/3296 713/320 |
| 2013/0232346 A1* | 9/2013 | Wu | G06F 1/3228 713/300 |
| 2013/0346774 A1* | 12/2013 | Bhandaru | G06F 1/3234 713/320 |

FOREIGN PATENT DOCUMENTS

| | | |
|---|---|---|
| CN | 104185827 A | 12/2014 |
| DE | 112012006163 T5 | 1/2015 |
| GB | 2514972 A | 12/2014 |
| JP | 2011089950 A | 5/2011 |
| JP | 2011-233158 A | 11/2011 |
| KR | 10-2014-0133883 A | 11/2014 |
| TW | 200719217 A | 5/2007 |
| TW | 200805149 A | 1/2008 |
| TW | 1483101 B | 5/2015 |
| WO | 2013/147906 A1 | 10/2013 |

OTHER PUBLICATIONS

International Preliminary Report on Patentability and Written Opinion received for PCT Patent Application No. PCT/US2012/031751, mailed on Jun. 24, 2014, 7 pages.

Office Action for Chinese Patent Application No. 2012800721396, mailed Mar. 23, 2016, 21 pages including 13 pages of English translation.

Office Action received for Taiwan Patent Application No. 102107669, mailed on Sep. 29, 2014, 4 Pages of Office Action and 7 Pages of English Translation including Search Report.

\* cited by examiner

CONTROLLING POWER CONSUMPTION IN MULTI-CORE ENVIRONMENTS

BACKGROUND

High performance computing (HPC) and supercomputing environments may require integration of multiple cores. However, power consumption in these environments may be significant.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve an apparatus that enables modulation of a frequency of a first core in a multi-core environment, wherein the apparatus may include logic to determine power limit assigned to a first core, logic to determine a stall count of the first core, and logic to modulate the frequency of the first core based at least on the power limit assigned to the first core and the stall count of the first core. The first core may be included in a first tile of a socket in the multi-core computer environment.

Embodiments may involve a system in which a phase locked loop (PLL) is configured to be associated with a clock signal in a multi-core environment. The system may include a socket coupled with the PLL and be configured to include multiple tiles. At least one of the tiles may include a first core and a second core. The first core may be configured to include logic to determine a power limit assigned to a first core, determine a stall count of the first core, and modulate the frequency of the first core based at least on the power limit assigned to the first core and the stall count of the first core. The modulation of the frequency of the first core may be performed independently of a frequency of the tiles not associated with the first core.

Embodiments may involve a computer implemented method that provides for modulating a frequency of a core in a first tile of a multi-core environment at least independently of cores in other tiles based at least on an estimated power requirement of the core, a power limit assigned to the core and stall count of the core. The first and the other tiles may be associated with a phase locked loop (PLL) of a socket.

Figure 1:
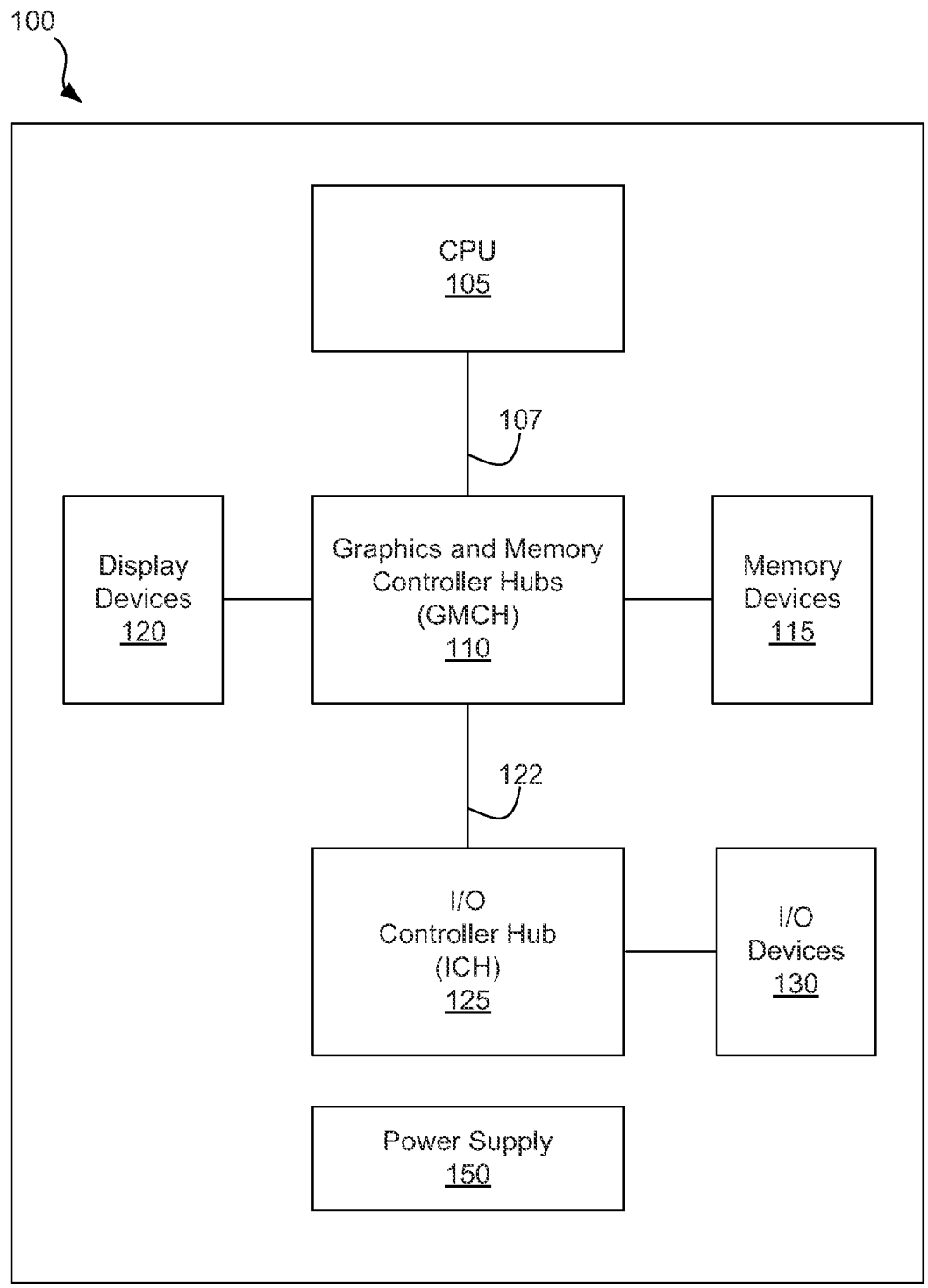
FIG. 1 is a block diagram that illustrates an example computer system, in accordance with some embodiments.

Turning to FIG. 1, a block diagram that illustrates an example computer system 100 is shown, in accordance with some embodiments. The computer system 100 may include a central processing unit (CPU) 105, a graphics and memory controller hub (GMCH) 110, and an input/output controller hub (ICH) 125. The GMCH 110 may be coupled to the CPU 105 via a bus 107. The ICH 125 may be coupled to the GMCH 110 via a bus 122. The GMCH 110 may also be coupled to memory devices 115 and display devices 120. The ICH 125 may be coupled to I/O devices 130. The GMCH 110 may include a graphics system 200 (not shown). Although the CPU 105, the GMCH 110 and the ICH 125 may be illustrated as separate components, the functions of two or more of these components may be combined. A power supply 150 may be used to provide power to the computer system 100. The power supply 150 may be a battery or an external power source.

For some embodiments, the CPU 105 may be a multi-core processor. For example, the multi-core processor may be based on the Many Integrated Core (MIC) architecture of Intel Corporation of Santa Clara, Calif. and may be implemented as a PCI Express (Peripheral Component Interconnect Express) card. The computer system 100 may also include many other components; however, for simplicity, they are not shown. For some embodiments, the computer system 100 may be a server computer system.

Figure 2:
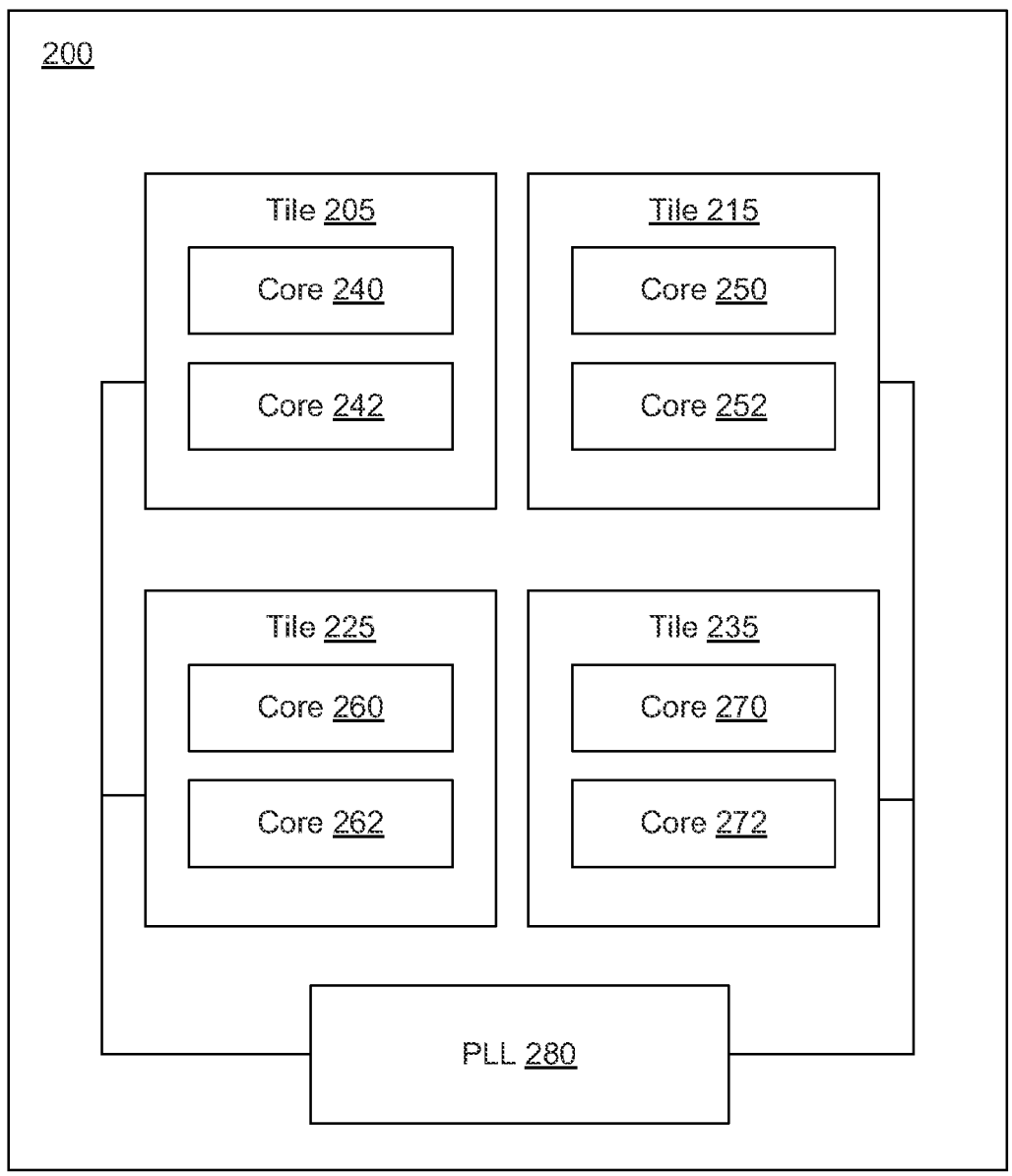
FIG. 2 is a block diagram that illustrates an example of a multi-core processor, in accordance with some embodiments.

Turning to FIG. 2, a block diagram that illustrates an example multi-core processor is shown, in accordance with some embodiments. The multi-core processor 200 may include multiple cores 240, 242, 250, 252, 260, 262, 270 and 272 and multiple tiles 205, 215, 225 and 235. Each tile may include two cores. For example, the tile 205 may include the cores 240 and 242. It should be noted that the number of tiles and cores in the multi-core processor 200 may be many more. For example, there may be fifty (50) cores included in twenty five (25) tiles. The cores 240-272 and the tiles 205-235 may be associated with a socket.

Generally, the multi-core processor 200 may be implemented with a single phase locked loop (PLL) 280 providing a common reference signal and therefore the same frequency for all of the tiles 205-235 and cores 240-272. This may limit all of the cores 240-272 to a single frequency and therefore a single performance (P) state. One possible solution to overcome this limitation is to implement one PLL per core or tile. This may enable placing the core 240 of the tile 205 into one P state (e.g., P0) and the core 250 of the tile 215 into a different P state (e.g., P1). This solution, however, may not be practical when there are design or power constraints.

Figure 3:
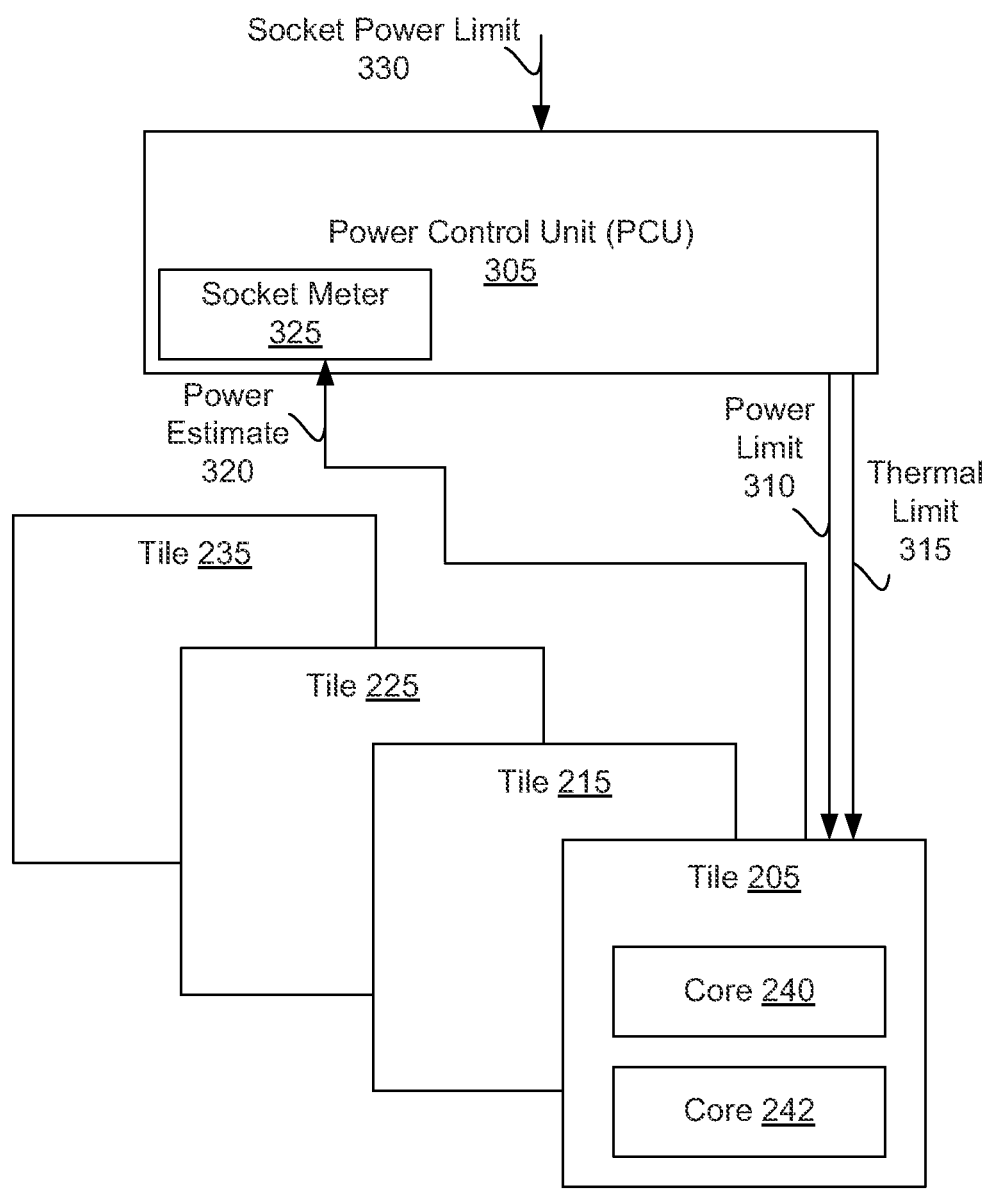
FIG. 3 is a block diagram that illustrates example of a socket power control unit (PCU), in accordance with some embodiments.

Turning to FIG. 3, a block diagram that illustrates an example socket power control unit (PCU) is shown, in accordance with some embodiments. The PCU 305 may be configured to assign a power limit 310 to which each of the tiles in the socket may be assigned. The PCU 305 may also assign a thermal limit 315 to the tile. The PCU 305 may include a socket meter 325, which may be configured to receive a power estimate 320 from each of the tiles. For some embodiments, the power limit 310 assigned to a tile may be proportional to a power estimate 320 of the tile. The PCU 305 may be associated with a socket power limit (also referred to as a running average power limit (RAPL)) 330.

The PCU 305 may periodically (e.g., every few milliseconds) re-evaluate the tile power limit 310 based on the RAPL 330. The PCU 305 may be configured to compare the power estimate 320 received from the tile with the assigned power limit 310. For some embodiments, when the power estimate 320 is less than the power limit 310, the PCU 305 may reduce the power limit 310. For some embodiments, when the power estimate 320 is close to the power limit 310 within a predetermined range, the PCU 305 may increase the power limit 310.

Figure 4:
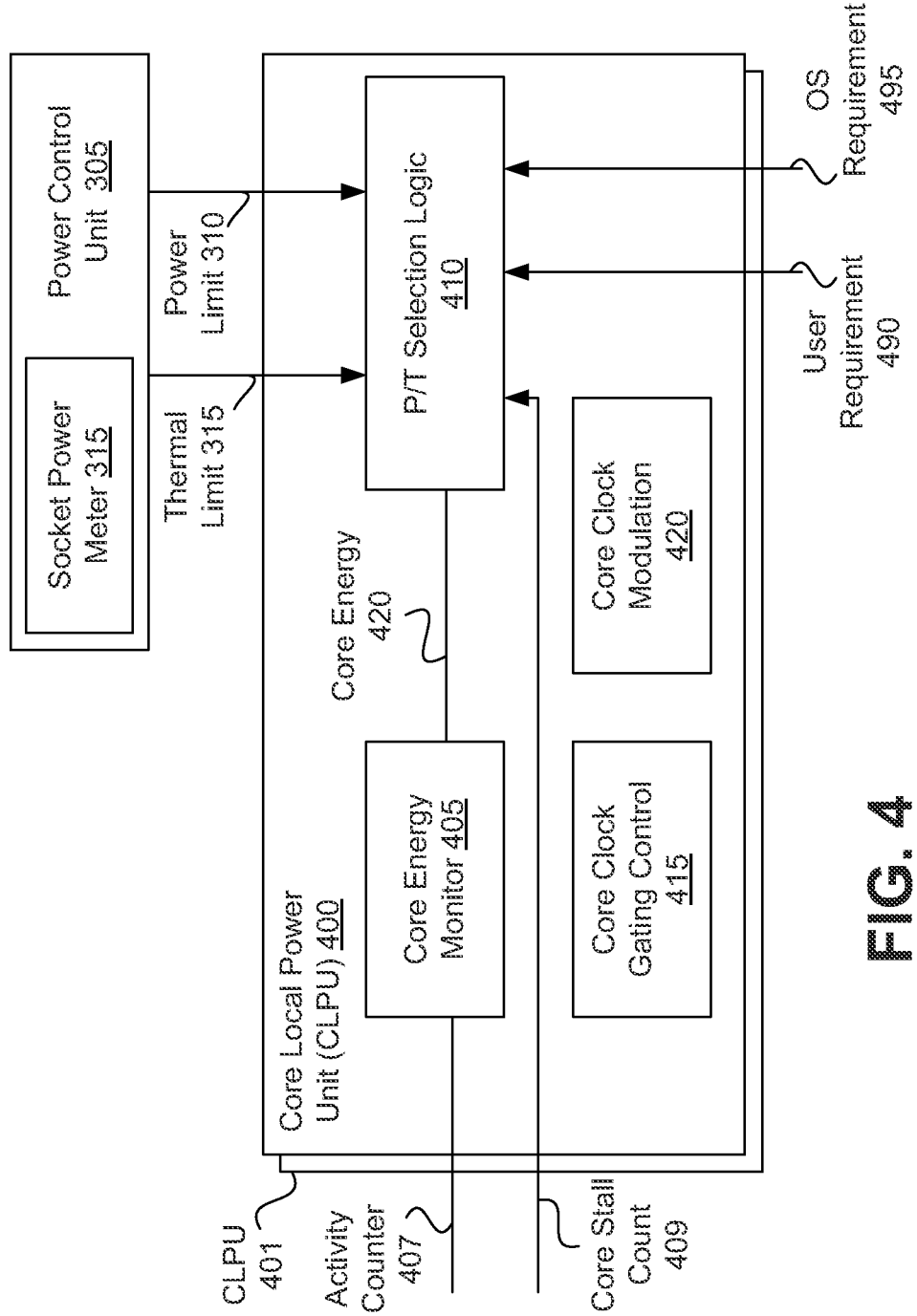
FIG. 4 is a block diagram that illustrates an example of a core local power unit (CLPU) that may be used to control a frequency of a core, in accordance with some embodiments.

Turning to FIG. 4, a diagram of a core local power unit that may be used to control the frequency of a core is shown, in accordance with some embodiments. Since the workloads running on the individual cores may be different, it may be advantageous to be able to control the P state for each core or tile independently of the other cores or tiles in the same socket while using the same PLL for the socket. In this example, core local power unit (CLPU) 400 may be associated with the core 240 (FIG. 3), and the CLPU 401 may be associated with the core 242 (FIG. 3).

The CLPU 400 may include a core energy monitor 405. For some embodiments, the power estimate 320 (shown in FIG. 3) may be determined by the core energy monitor 405 of the CLPU 400 and the core energy monitor (not shown) of the CLPU 401. The CLPU 400 may include Performance/Throttle (P/T) selection logic 410. The PIT selection logic 410 may be configured to control the power consumption of the core 240. This may include the placing the core 240 into different performance (P) states or throttling (T) states.

The P/T selection logic 410 may be configured to modify the clock rate or frequency at which the core 240 may be operating. The P/T selection logic 410 may also control a voltage operating point for the core 241. For example, when placed in a P0 state, the core 240 may operate at a relatively high frequency high performance level and may have more power consumption; when placed in a P1 state, the frequency and performance of the core 240 may be lower and the power consumption may be less; when placed in the T or throttled state, the core 240 may he throttled by modulating the frequency and the power consumption may be at its lowest. Having the core 240 operating at a low frequency level may also reduce the thermal load and cooling requirement associated with the core 240.

The core energy monitor 405 may be configured to receive an activity counter 407 from the core 240 to determine the core energy 420. The activity counter 407 may include information related to a number of times the core 240 is placed in the C0 state, the number of instructions retired, the number of core stalls, etc.

The P/T selection logic 410 may be configured to receive information regarding the core energy 420 from the core energy monitor 405, core stall count 409 from the core 240, thermal limit 315 from the PCU 305, and power limit 310 from the PCU 305. For some embodiments, when the power estimate 320 is determined to be greater than the assigned power limit 310, the CLPU 400 may cause the frequency of the core with the higher core stalls to be modulated. A threshold may be used to determine whether the core stall count 409 is at a level that may affect the modulation of the frequency of the core 240. For example, when the core stalls, it may not perform any instruction. As such, modulating the frequency of the core to a lower frequency may not affect its performance but may reduce its power consumption. The modulation of the frequency may be proportional to the core stall ratio (e.g., stall vs. not stall) and may be bounded by the power limit. The modulation of the frequency of the core may be performed by the core clock modulation module 420. The core clock modulation module 410 may be coupled with the core clock gating control 415. The core clock gating control 415 may be coupled with the PLL 280 (shown in FIG. 2). By modulating the frequency of the cores in the socket based on the estimated power 320 and the power limit 310, the performance and power consumption of the individual cores may be optimized. For some embodiments, the modulation of the frequency of the core may further be based on the assigned thermal limit 315. For example, when it is determined that a temperature of the core is near the assigned thermal limit 315, the P/T selection logic 410 may reduce the frequency of the core. The P/T selection logic 410 may also receive user requirement 490 and Operating System (OS) requirement 495 and use these requirements to determine how to modulate the frequency.

Figure 5:
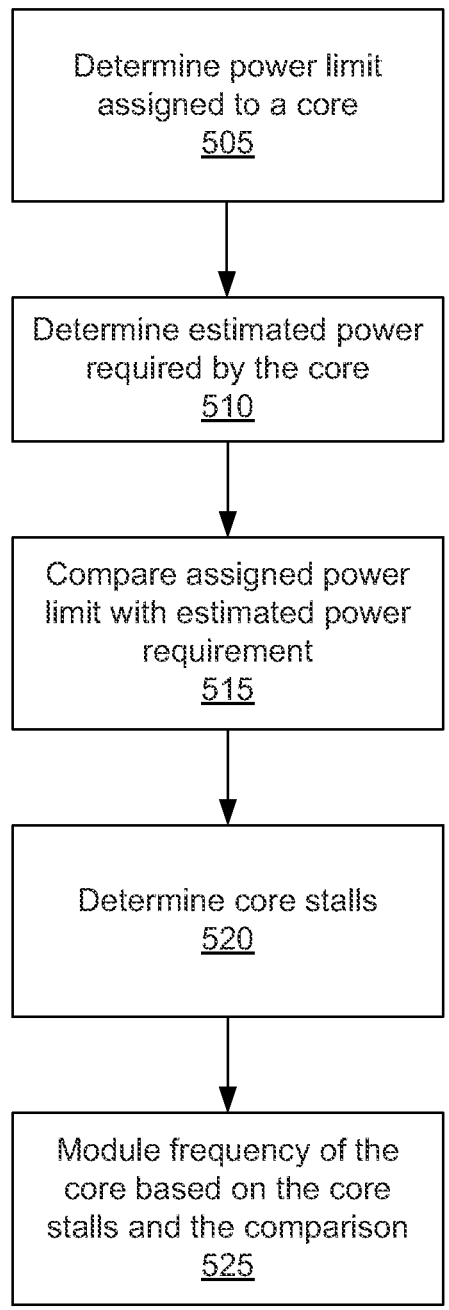
FIG. 5 is a flowchart of an example method of modulating the frequency of a core in a tile, in accordance with some embodiments.

Turning to FIG. 5, an example flow diagram illustrating a process performed by a core local power unit (CLPU), in accordance with some embodiments. The process may correspond to the CLPU 400 managing the power consumption of the core 240. At block 505, the CLPU may determine a power limit assigned to a core. The power limit may be assigned by a PCU 305 (shown in FIG. 4). At block 510, the estimated power required by the core may be determined. The estimated power requirement may be determined by the core energy monitor 405 (shown in FIGS. 4 and 5). At illustrated block 515, the power limit is compared with the estimated power requirement to determine whether the power assigned to the core by the PCU 305 is appropriate. For example, when the estimated power requirement is much less than the power limit assigned by the PCU 305, the power limit may be reduced. At block 520, a number of core stalls may be determined. At block 525, the frequency of the core may be modulated based on a result of the comparison between the estimated power requirement and the power limit and based on the number of core stalls. For example, the frequency may be decreased when the number of core stalls is higher than a predetermined threshold and the estimated power requirement is less than the power limit. Although not shown in FIG. 5, the frequency of the core may also be modulated based on the thermal limit assigned to the core by the PCU 305.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Example sizes/models/valuues/ranges may have been given, although embodiments of the present invention are not limited to the same. As manufacturing techniques (e.g., photolithography) mature over time, it is expected that devices of smaller size could be manufactured. In addition, well known power/ground connections to integrated circuit (IC) chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. An apparatus comprising:
   logic to determine a power limit assigned to a first core;
   logic to determine stall count of the first core, wherein the first core is not to perform any instruction when the core is stalled; and
   logic to modulate a frequency of the first core based at least on the power limit assigned to the first core and the stall count of the first core, wherein the frequency of the first core is to be decreased when the stall count is higher than a threshold, and wherein the first core is to be included in a first tile of a socket in a multi-core computer environment.

2. The apparatus of claim 1, further comprising:
   logic to determine an estimated power requirement of the first core, wherein the frequency of the first core is to be modulated further based on the estimated power requirement of the first core.

3. The apparatus of claim 2, wherein the frequency of the first core is to be decreased when the estimated power requirement is less than the power limit.

4. The apparatus of claim 2, wherein the frequency of the first core is modulated proportionally to a core stall ratio.

5. The apparatus of claim 2, wherein the frequency of the first core is modulated within a boundary of the power limit.

6. The apparatus of claim 2, wherein the estimated power requirement of the first core is determined by a core energy monitor of a core local power unit (CLPU) associated with the first core.

7. The apparatus of claim 2, wherein the power limit is to be assigned to the first core by a power control unit (PCU) associated with the socket.

8. The apparatus of claim 7, further comprising logic to determine a thermal limit assigned to the first core by the PCU.

9. The apparatus of claim 8, wherein the frequency of the first core is to be modulated based on the thermal limit.

10. The apparatus of claim 1, wherein the logic to modulate the frequency of the first core is coupled with a phase locked loop (PLL) associated with the socket.

11. The apparatus of claim 10, wherein the socket is to be configured to include the first tile and a second tile, and wherein the first tile and the second tile are to be associated with the PLL.

12. The apparatus of claim 11, wherein the frequency of the first core is to be modulated independently of a frequency associated with the second tile.

13. The apparatus of claim 11, wherein the first tile is to include the first core and a second core, and wherein the frequency of the first core is to be modulated independently of a frequency associated with the second core.

14. A computer-implemented method comprising:
   modulating a frequency of a core in a first tile of a multi-core environment at least independently of cores in other tiles based at least on an estimated power requirement of the core, a power limit assigned to the core and a stall count of the core, wherein the first core is not to perform any instruction when the core is stalled, wherein the frequency of the first core is decreased when the stall count is higher than a threshold, and wherein the first tile and the other tiles are associated with a phase locked loop (PLL) of a socket.

15. The method of claim 14, further comprising:
   determining the estimated power requirement of the core;
   determining the power limit assigned to the core; and
   determining the stall count of the core.

16. The method of claim 15, wherein modulating the frequency of the core in the first tile includes decreasing the frequency of the core when the estimated power requirement is less than the power limit.

17. The method of claim 15, wherein the frequency of the core is modulated proportionally to a core stall ratio.

18. The method of claim 17, wherein the frequency of the core is modulated within a boundary of the power limit.

19. The method of claim 14, wherein the estimated power requirement of the core is determined by a core energy monitor of a core local power unit (CLPU) associated with the core.

20. The method of claim 14, wherein the frequency of the core in the first tile is modulated independently of another core in the first tile.

21. The method of claim 14, wherein the frequency of the core in the first tile is decreased when the estimated power requirement is less than the power limit.

22. The method of claim 14, wherein the frequency of the core is modulated proportionally to a core stall ratio.

23. The method of claim 14, wherein the frequency of the core is modulated within a boundary of the power limit.

24. A system comprising:
   a phase locked loop (PLL) configured to be associated with a clock signal in a multi-core environment;

a socket coupled with the PLL and configured to include multiple tiles, at least one of the tiles including a first core and a second core, wherein the first core is configured to include logic to:

determine a power limit assigned to a first core;

determine a stall count of the first core, wherein the first core is not to perform any instruction when the core is stalled; and modulate a frequency of the first core based at least on the power limit assigned to the first core and the stall count of the first core independently of a frequency of tiles not associated with the first core, wherein the frequency of the first core is to be decreased when the stall count is higher than a threshold.

25. The system of claim 24, wherein the first core is further configured to include logic to determine an estimated power requirement of the first core.

26. The system of claim 25, wherein the frequency of the first core is to be modulated based on the estimated power requirement of the first core.

27. The system of claim 25, wherein the frequency of the first core is to be modulated based on a comparison between the power limit assigned to the first core and the estimated power requirement of the first core.

28. The system of claim 24, wherein the frequency of the first core is to be modulated independently of a frequency of the second core.

* * * * *